United States Patent [19]

Bradley

[11] Patent Number: 4,926,288
[45] Date of Patent: May 15, 1990

[54] OVER-CURRENT PROTECTION CIRCUIT

[75] Inventor: Donald A. Bradley, Morgan Hill, Calif.

[73] Assignee: Wiltron Company, Morgan Hill, Calif.

[21] Appl. No.: 175,957

[22] Filed: Mar. 31, 1988

[51] Int. Cl.⁵ .............................................. H02H 3/08
[52] U.S. Cl. ...................................... 361/101; 361/98
[58] Field of Search ..................... 361/87, 93, 100, 101

[56] References Cited
U.S. PATENT DOCUMENTS 4,438,473  3/1984  Cawley et al. .................... 361/93 X

*Primary Examiner*—Derek S. Jennings
*Attorney, Agent, or Firm*—Fliesler, Dubb, Meyer & Lovejoy

[57] ABSTRACT

An electronic circuit is provided for protecting an electronic system and its power supply from damages caused by an over-current condition. The circuit automatically enters into a first state upon application of power from the power supply. In this first state, current is allowed to pass from the power supply through a channel to the electronic system. Upon detecting an over-current condition, a positive feedback will cause the circuit to enter into a second state, wherein the channel is cutoff.

6 Claims, 1 Drawing Sheet

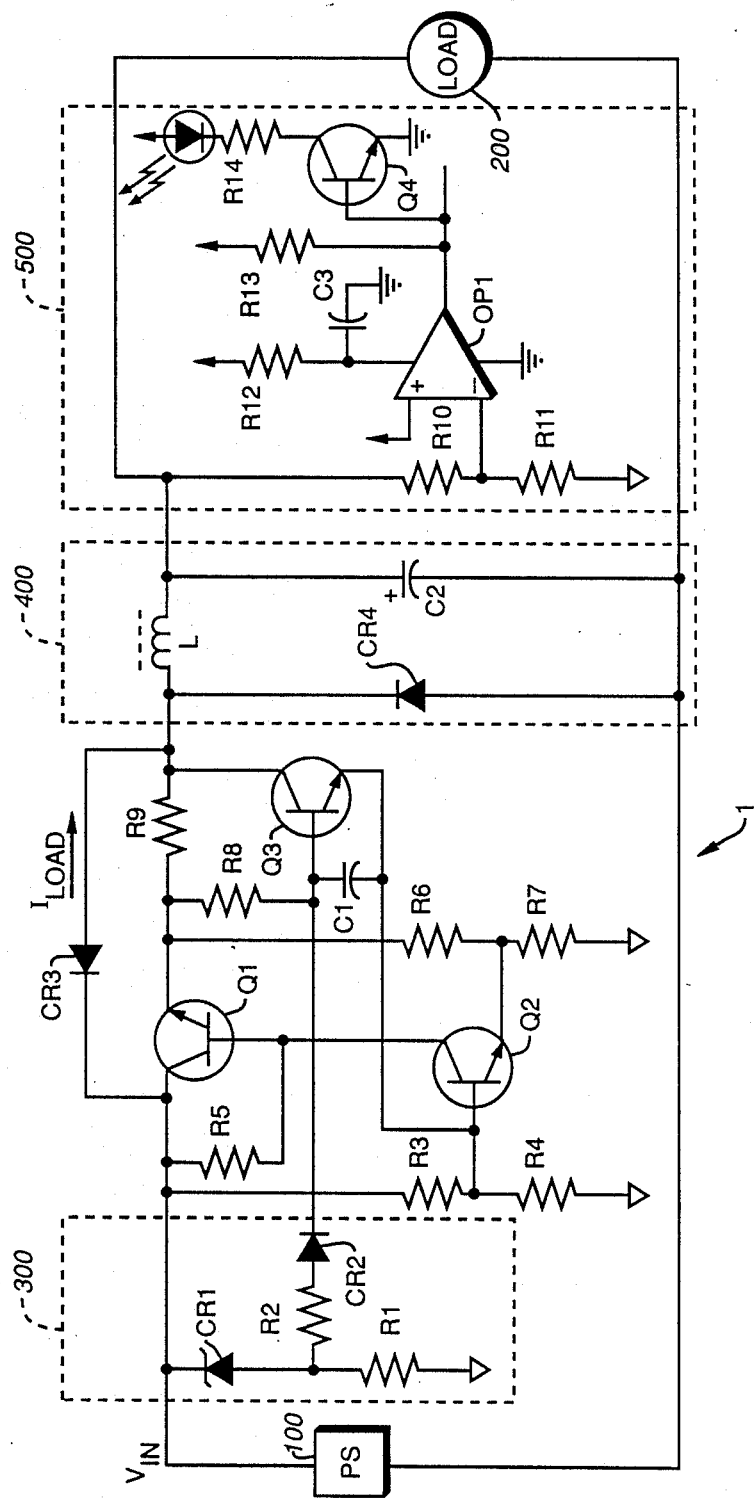
FIG._1

OVER-CURRENT PROTECTION CIRCUIT

TECHNICAL FIELD

The present invention relates generally to power supply protection. More specifically, this invention relates to a circuit that emulates the function of a fuse for protecting an electronic system and its power supply from damages caused when a more than expected amount of current is drawn from the power supply.

BACKGROUND OF THE INVENTION

A conventional method of protecting electronic systems from an over-current condition (that is, a condition when more than a predetermined amount of electric current is drawn from the power supply) is by using a separate power supply for each subsystem, together with a circuit breaker, or a replaceable fuse, along with each power supply, so that, when an over-current condition occurs, the fuse will melt, or the circuit breaker will trip, thereby disconnecting the power supply from the subsystem.

When the number of subsystems becomes large, the use of separate power supplies, together with the corresponding number of fuse boxes required, will take up a significant amount of physical space. In addition, when the number of subsystems increases, the task associated with storing spare fuses and replacing melt fuses may become cumbersome.

Accordingly, there is a need for an electronic circuit which can perform the function of a fuse for protecting electronic systems from an over-current condition. However, it is also desirable to have a protection circuit which requires no fuse replacement, or no resetting of a circuit breaker, after the occurrence of an over-current condition.

SUMMARY OF THE INVENTION

The present invention is a circuit for protecting an electronic system and its power supply from an over-current condition. The circuit comprises channel means responsive to a first control signal for passing an electric current from said power supply to said electronic system, first control means for supplying said first control signal to said channel means, sensor means coupled to said channel means for sensing the electric current passing through said channel means; and second control means coupled to said sensor means for disabling said first control means when said electric current passing through said channel means exceeds a predetermined value.

BRIEF DESCRIPTION OF THE DRAWINGS

FIG. 1 is, a schematic circuit diagram of a preferred embodiment of the present invention.

DETAILED DESCRIPTION

Referring to FIG. 1, there is shown an illustrative embodiment of a power supply protection circuit 1 according to present invention. The circuit 1 comprises channel means in form of a first transistor Q1 for passing, through a current path between its emitter and collector, an electric current from a power supply 100 to a load 200.

In accordance with transistor characteristics, the current path through transistor Q1 is controlled by a first control signal applied to its base.

This first control signal is supplied from the collector of a second transistor Q2. The base of this second transistor Q2 is biased at a predetermined voltage level by resistors R3 and R4, while its emitter is biased at another predetermined voltage level by resistors R6 and R7. The first control signal is supplied by the second transistor Q2 though its emitter-collector junction. The first control signal supplied by the transistor Q2 is controlled by a second control signal applied to base of the transistor Q2.

The base of the second transistor Q2 is connected to the collector of a third transistor Q3. In accordance with transistor characteristics, the voltage between the collector and the emitter of the transistor Q3 is dependent upon the voltage difference between its base and emitter. This voltage is in turn equals to the voltage drop across resistors R8 and R9.

Resistor R9 lies in the aforementioned current path between the power supply 100 and the load 200 through transistor Q1. It senses the current through the current path by providing a voltage drop, $V_{R9}$, in accordance with Ohm's law, as a function of the current drawn by the load 200 from the power supply 100. When the current passing through the current path of Q1 is higher than a predetermined value, the voltage drop across resistor R9 will disable transistor Q2 from supplying said first control signal, as will be described hereinafter, thereby cutting off the current path.

Once the current path is cutoff, it will be kept in a cutoff state by circuit 300. Circuit 300 causes a current to flow into the base of transistor Q3 when the voltage at the emitter of Q3 is below a predetermined threshold value. In normal operation, no such current would flow into transistor Q3.

The voltage level at the base of transistor Q2 and the voltage level at the emitter of transistor Q2 are biased such that a current, $I_{12}$, will automatically flow between the base of transistor Q1 and the collector of transistor Q2 when power is applied from power supply 100 to the circuit 1.

Transistor Q1 is selected to have a current amplification factor such that Q1 operates in saturation during normal operation. In a preferred embodiment of this invention, such amplification factor is provided by using a Darlington transistor as transistor Q1.

The current, $I_{load}$, passing through transistor Q1, will cause a voltage drop of $V_{R9}$ ($=I_{load} * R9$) across resistor R9. When the voltage difference between the emitter and the base of transistor Q3 less than $V_{Q3be(on)}$, the forward voltage of the base-emitter junction, transistor Q3 will switch off and no current will flow across resistor R8. In that case, the voltage difference between the emitter and the base of transistor Q5 is equal to the voltage drop across resistor R9.

As soon as the current $I_{load}$ drawn by the load 200 from the power supply 100 reaches the point where $V_{R9}$ is greater than $V_{Q3be(on)}$, transistor Q3 will switch on. When the emitter collector junction conducts, the collector voltage of transistor Q3 will be pulled up. Since the collector of transistor Q3 is connected to the base terminal of transistor Q2, when transistor Q3 switches on, the potential of the base of transistor Q2 will rise, causing an increase in the collector current of transistor Q2. This in turn will cause transistor Q1 to saturate more. It can be seen that transistor Q2 and Q3 together form a positive feedback path which controls the current flowing into transistor Q1.

When the current $I_{load}$ increases to the point where transistor $Q_1$ goes from its saturation state to its linear state, the voltage difference between the emitter and the collector of transistor Q1 will increase, causing the voltage at the emitter of transistor Q3 to drop.

As the voltage at the emitter of transistor Q3 drops, its collector voltage will follow. This means that the base voltage of transistor Q2 will also drop. As the emitter of Q2 is biased by resistors R6 and R7, when the emitter voltage of transistor Q3 drops to a certain level, transistor Q2 will be cut off, which in turn will switch off transistor Q1.

When no current flows through transistor Q1, the voltage drop across resistor R9 will disappear. However, transistor Q3 will still switch on because the bias circuit 300 provides a current $I_{b2}$ to the base of transistor Q3 when the emitter voltage of Q3 drops below a certain threshold value. This threshold value is approximately equal to the input voltage of the power supply 100, minus the voltage drop across diodes CR1 and CR2, and the base-emitter voltage of transistor Q3. Once the current $I_{load}$ is high enough to cause the voltage at the emitter of Q3 to go below this voltage value, transistor Q3 will conduct independently of the voltage across resistor R9 and cut off transistors Q1 and Q2 in a regenerative manner.

Once circuit 1 is shutoff, it can be restarted in two conditions:

1. By bringing up the input voltage, $V_{in}$ of the power supply from zero volt while the current drawn by load 200 is less than the cutoff value—In this case, because diode CR1 will not conduct if $V_{in}$ is below its breakdown voltage, transistor Q1 is able to come up to saturation.

2. By removing the output load 200 completely—In this case, because the output load is removed, the output voltage will be allowed to rise due to the current path from the power supply 100 through diode CR1, resistor R2, diode CR2, resistors R8 and R9.

In the preferred embodiment of the present invention, a filter circuit 400 is optionally provided as shown to filter out noise signals. Also, as an option, an indicator circuit is also connected as shown to provide an indication when the power is cutoff by the protection circuit 1.

A set of exemplary values for the illustrative implementation of the power protection circuit 1 shown in FIG. 1 is given in table 1.

TABLE 1

| | |
|---|---|
| Vin = | 18 volt |
| R1 = | 5.11K |
| R2 = | 1K |
| R3 = | 9.09K |
| R4 = | 90.9K |
| R5 = | 5.11K |
| R6 = | 2.49K |
| R7 = | 9.09K |
| R8 = | 100 |
| R9 = | 0.5 |
| Q1 = | 2N6041 |
| Q2 = | 2N2222 |
| Q3 = | 2N2222 |
| Q4 = | 2N2907 |
| CR1 = | IN746 |
| CR2 = | IN4003 |
| CR3 = | IN4003 |
| CR4 = | IN4003 |

While the invention has been particular shown and described with reference to the above preferred embodiment, it will be understood by those skilled in the art that the foregoing and other changes in form and detail may be made therein without departing from the spirit and scope of the invention. For example, although the above embodiment is described with reference to a particular semiconductor technology (e.g. bipolar) and particular types of transistor devices (e.g. npn transistors), it will be obvious to those skilled in the art that other semiconductor technologies (e.g. metal oxide semiconductor, MOS) and other types of transistor devices may be used.

What is claimed is:

1. A circuit for protecting an electronic system and its power supply from an over-current condition, comprising:

channel means responsive to a first control signal for passing an electric current from said power supply to said electronic system, said channel means including a first transistor having a first current electrode, a second current electrode and a first control electrode, said first current electrode being connectable to said power supply, said second current electrode being connectable to said electronic system and said first control electrode receiving said first control signal;

first control means for supplying said first control signal to said channel means, said first control means including a second transistor having a third current electrode, a fourth current electrode and a second control electrode, said first control means further including means for biasing said second control electrode at a first predetermined voltage and means for biasing said third current electrode at a second predetermined voltage so that a signal is provided at said fourth current electrode, said signal being provided to said first control electrode as said first control signal;

sensor means coupled to said channel means for sensing said electric current passing through said channel means; and second control means coupled to said sensor means for disabling said first control means by positive feedback action of said electric current, when said electric current passing through said channel means exceeds a predetermined value.

2. A circuit as in claim 1, wherein said second control means includes a third transistor having a fifth current electrode, a sixth current electrode and a third control electrode, wherein said fifth current electrode is connected to said second control electrode and said sixth current electrode is coupled to said sensor means, and includes means for biasing said third control electrode at a third predetermined voltage; and wherein said sensor means is a resistor connected between said second current electrode and said sixth current electrode.

3. A circuit as in claim 2, further comprising means for providing an indication when said electric current from said power supply is cut off.

4. A circuit as in claim 3, wherein said means for biasing said third control electrode comprises a first diode connected between said power supply and said third control electrode for providing a voltage drop from the power supply to the third control electrode and a second diode connected between said power supply and said third control electrode in series with said first diode for allowing current to flow substantially only from said power supply to said third control electrode.

5. A circuit for limiting current from a power supply to a load, comprising:
a first transistor for providing a current path from said power supply to said load, said first transistor having a first control electrode, a first current electrode and a second current electrode, said first control electrode receiving a first control signal for controlling a first current channel between said first current electrode which is coupled to said power supply and said second current electrode which is coupled to said load;
a second transistor responsive to a second control signal for supplying said first control signal, said second transistor having a second control electrode, a third current electrode and a fourth current electrode, said second control electrode receiving a second control signal for controlling a second current channel between said third current electrode and said fourth current electrode, said third current electrode being connected to said first control electrode, including first biasing means for providing said second control signal to said second control electrode so that a signal is provided at said third current electrode during normal operation, said signal provided at said third current electrode being said first control signal;
a third transistor for removing said second control signal, said third transistor having a third control electrode, a fifth current electrode and a sixth current electrode, said third control electrode responsive to a third control signal for controlling a third current channel between said fifth current electrode and said sixth electrode, and sixth current electrode being connected to said second control electrode, including second biasing means for biasing said third control electrode so that said third current channel is not conductive during normal operation, further including means coupled to said third control electrode for causing a current to pass through said third current channel when said fifth current electrode is at a voltage lower than a prespecified voltage value; and
current sensor connected between said second current electrode and said fifth current electrode, said current sensor causing said third current channel to become conductive when a prespecified amount of current flows through said first current channel.

6. A circuit for protecting an electronic system and its power supply from an over-current condition, comprising:
channel means responsive to a first control signal for passing an electric current from said power supply to said electronic system, said channel means including a first transistor having a first current electrode, a second current electrode and a first control electrode, said first current electrode being connectable to said power supply, said second current electrode being connectable to said electronic system and said first control electrode receiving said first control signal;
first control means for supplying said first control signal to said channel means, said first control means including a second transistor having a third current electrode, a fourth current electrode and a second control electrode, said first control means further including means for biasing said second control electrode at a first predetermined voltage and means for biasing said third current electrode at a second predetermined voltage so that a signal is provided at said fourth current electrode, said signal being provided to said first control electrode as said first control signal;
sensor means coupled to said channel means for sensing said electric current passing through said channel means;
second control means coupled to said sensor means for disabling said first control means by positive feedback action of said electric current when said electric current passing through said channel means exceeds a predetermined value, said second control means including a third transistor having a fifth current electrode, a sixth current electrode and a third control electrode, wherein said fifth current electrode is connected to said second control electrode and said sixth current electrode is coupled to said sensor means, and includes means for biasing said third control electrode at a third predetermined voltage; and
wherein said sensor means is a resistor connected between said second current electrode and said sixth current electrode.

* * * * *